United States Patent

[11] 3,631,468

[72] Inventor William L. Spaid
R.R. No. 1 South River Road, Cedarville, Ohio 45314

[21] Appl. No. 51,791
[22] Filed July 2, 1970
[45] Patented Dec. 28, 1971

[54] ANALOG TO DIGITAL CONVERTER
3 Claims, 9 Drawing Figs.

[52] U.S. Cl. .................................................. 340/347 AD, 340/347 SH
[51] Int. Cl. .................................................. H03k 13/02
[50] Field of Search .................................................. 340/347; 235/154; 179/15.55; 307/227; 328/151; 324/98–100, 111

[56] References Cited

UNITED STATES PATENTS 2,801,281 7/1957 Oliver et al. .................. 340/347 X

*Primary Examiner*—Maynard R. Wilbur
*Assistant Examiner*—Charles D. Miller
*Attorneys*—Harry A. Herbert, Jr. and James S. Shannon

ABSTRACT: An analog to binary number converter, for operation in synchronism with the clock of a computer, in which the analog input signal charges a first capacitor to the analog voltage. A second capacitor, initially charged to a voltage equal on the analog scale to the value of the most significant bit of the binary number, is subsequently discharged as an exponential function of time such that the capacitor voltage at the end of each of a succession of equal bit intervals, which are the clock pulse intervals, has one-half its value at the start of the interval. At the start of each of the successive bit intervals the voltage of the first capacitor is compared with the voltage of the second capacitor. If greater, the first capacitor is permitted to discharge during the interval sufficiently to reduce its voltage by the amount of the second capacitor voltage at the start of the interval. If less, the first capacitor voltage is held constant during the interval. At each comparison, a binary 1 is generated if the first capacitor voltage is greater than the second capacitor voltage and a binary O if less, thus generating a serial binary number. By using a plurality of such converters and overlapping their conversion cycles, parallel binary codes are generated at an analog sampling rate equal to or a multiple of the clock rate.

Patented Dec. 28, 1971 3,631,468

5 Sheets-Sheet 1

Figure 1:
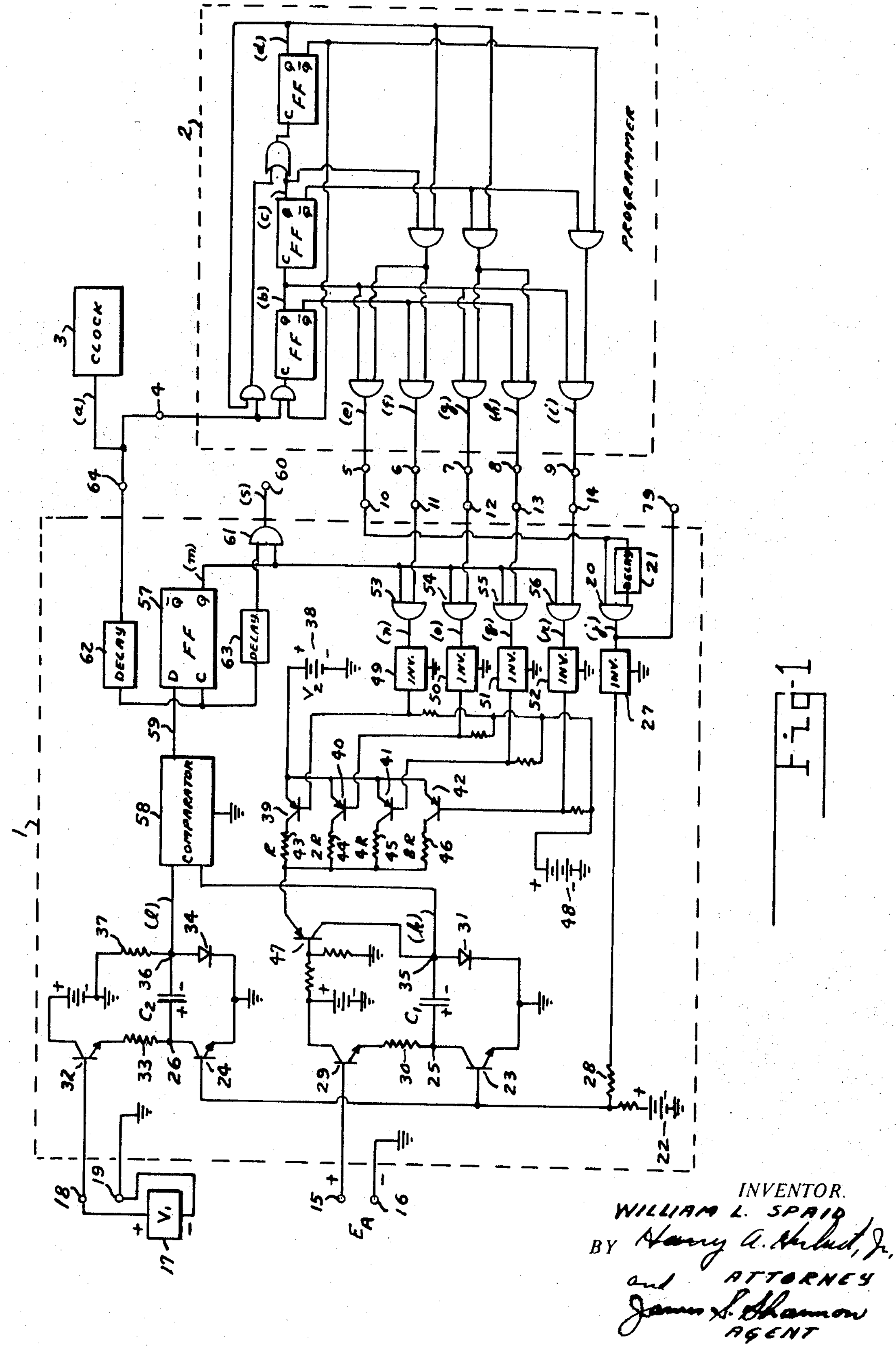

INVENTOR.
WILLIAM L. SPAID
BY Harry A. Herbert, Jr.
ATTORNEY
and James S. Shannon
AGENT

| BEFORE CLOCK | | AFTER CLOCK |
|---|---|---|
| D | Q | Q |
| 1 | 1 | 1 |
| 1 | 0 | 1 |
| 0 | 1 | 0 |
| 0 | 0 | 0 |

INVENTOR.
WILLIAM L. SPAID
BY Harry A. Herbert, Jr.
ATTORNEY
and James S. Shannon
AGENT INVENTOR.
WILLIAM L. SPAID
BY Henry A. Herbert, Jr.
and ATTORNEY
James L. Shannon
AGENT INVENTOR.
WILLIAM L. SPAID
BY Harry A. Herbert, Jr.
and ATTORNEY
James S. Shannon
AGENT Patented Dec. 28, 1971 3,631,468

5 Sheets-Sheet 5

INVENTOR.
WILLIAM L. SPAID
BY Harry A. Herbert, Jr.
and ATTORNEY
James S. Shannon
AGENT

ANALOG TO DIGITAL CONVERTER

The purpose of this invention is to provide an analog to digital converter capable of operating in synchronism with the clock of a computer and particularly suited to integrated circuit techniques. It is also the purpose to provide apparatus for converting a varying analog into parallel binary code at a sampling rate equal to or a multiple of the clock pulse rate.

Figure 2:
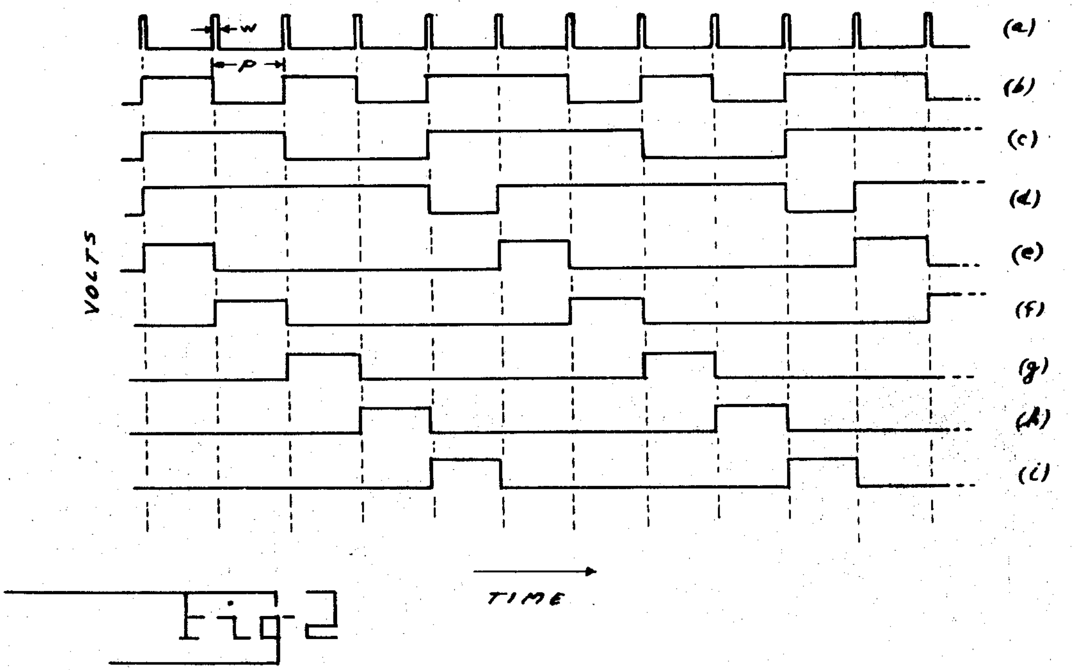
Figure 5:
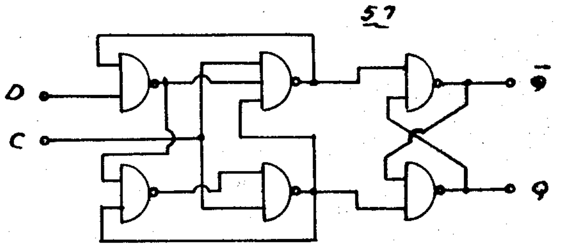
Figure 4:
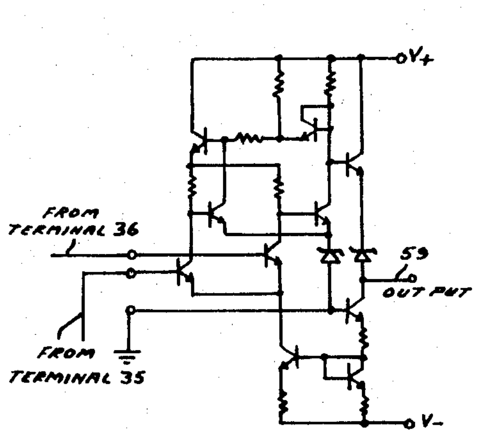
Figure 3:
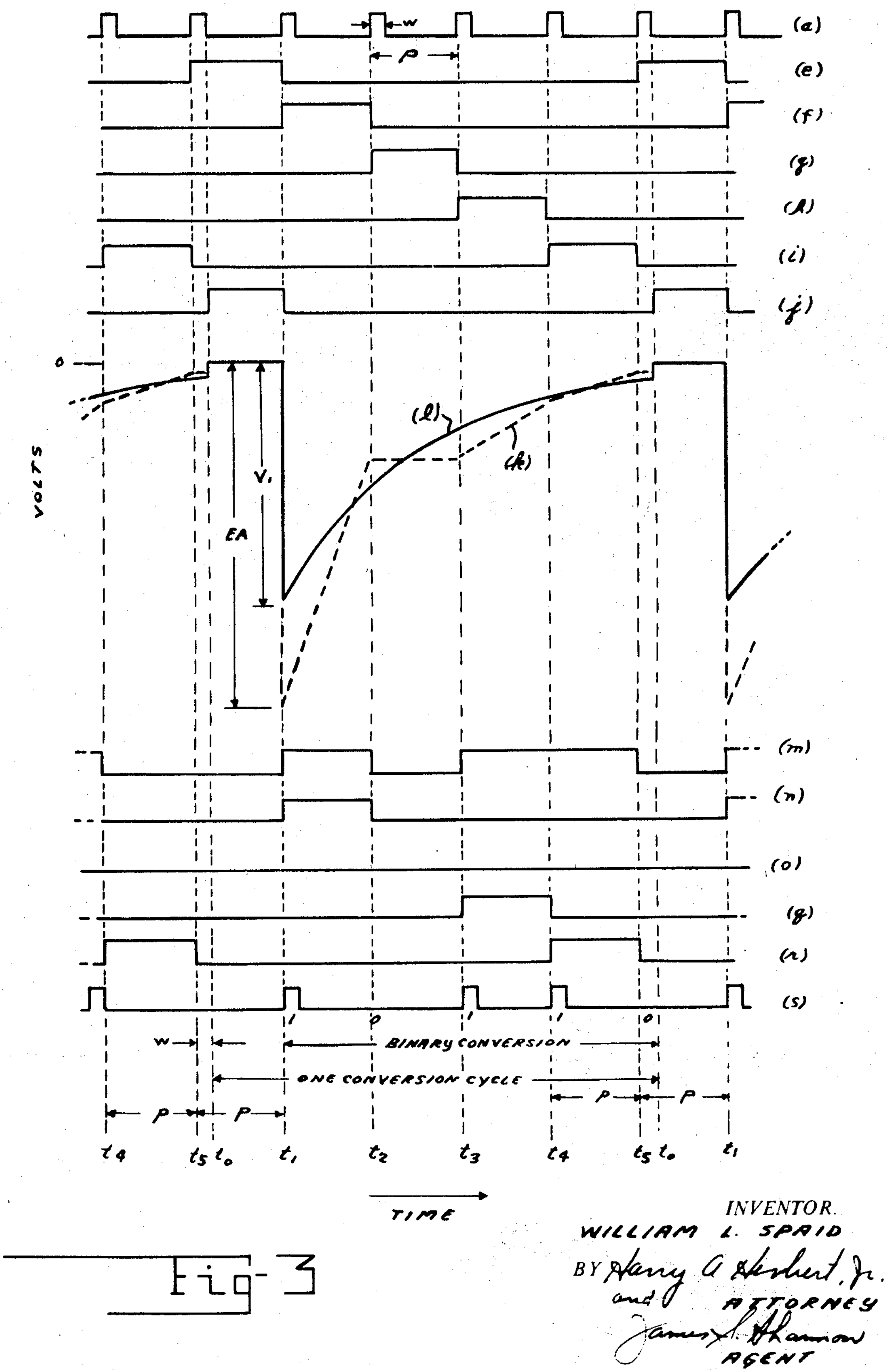
Figure 6:
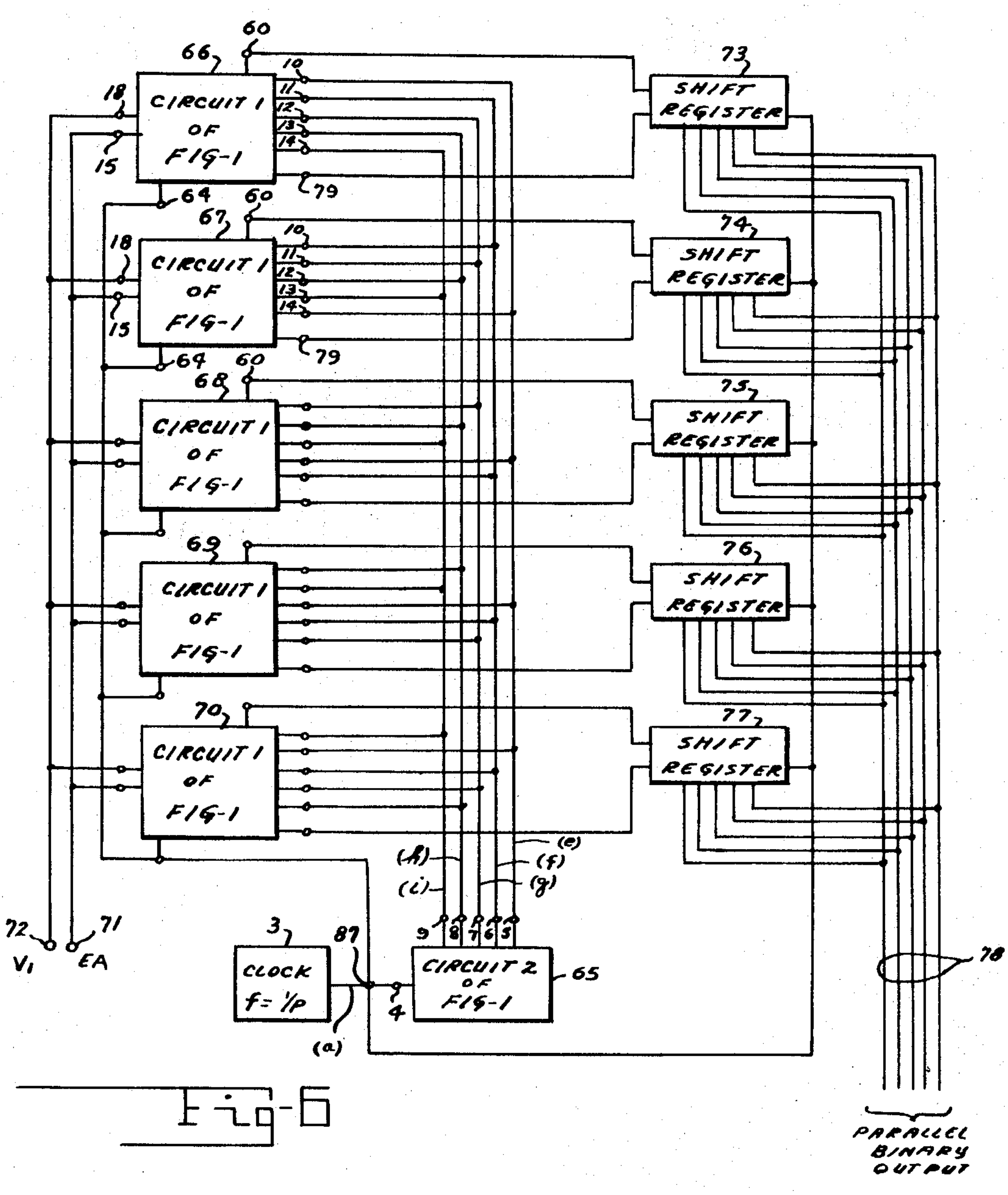
Figure 9:
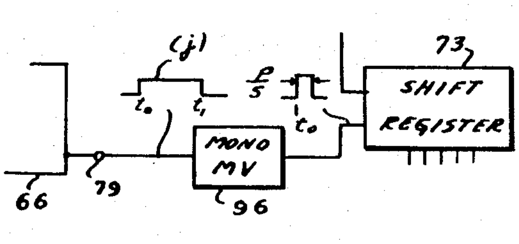
Figures 7, 8:
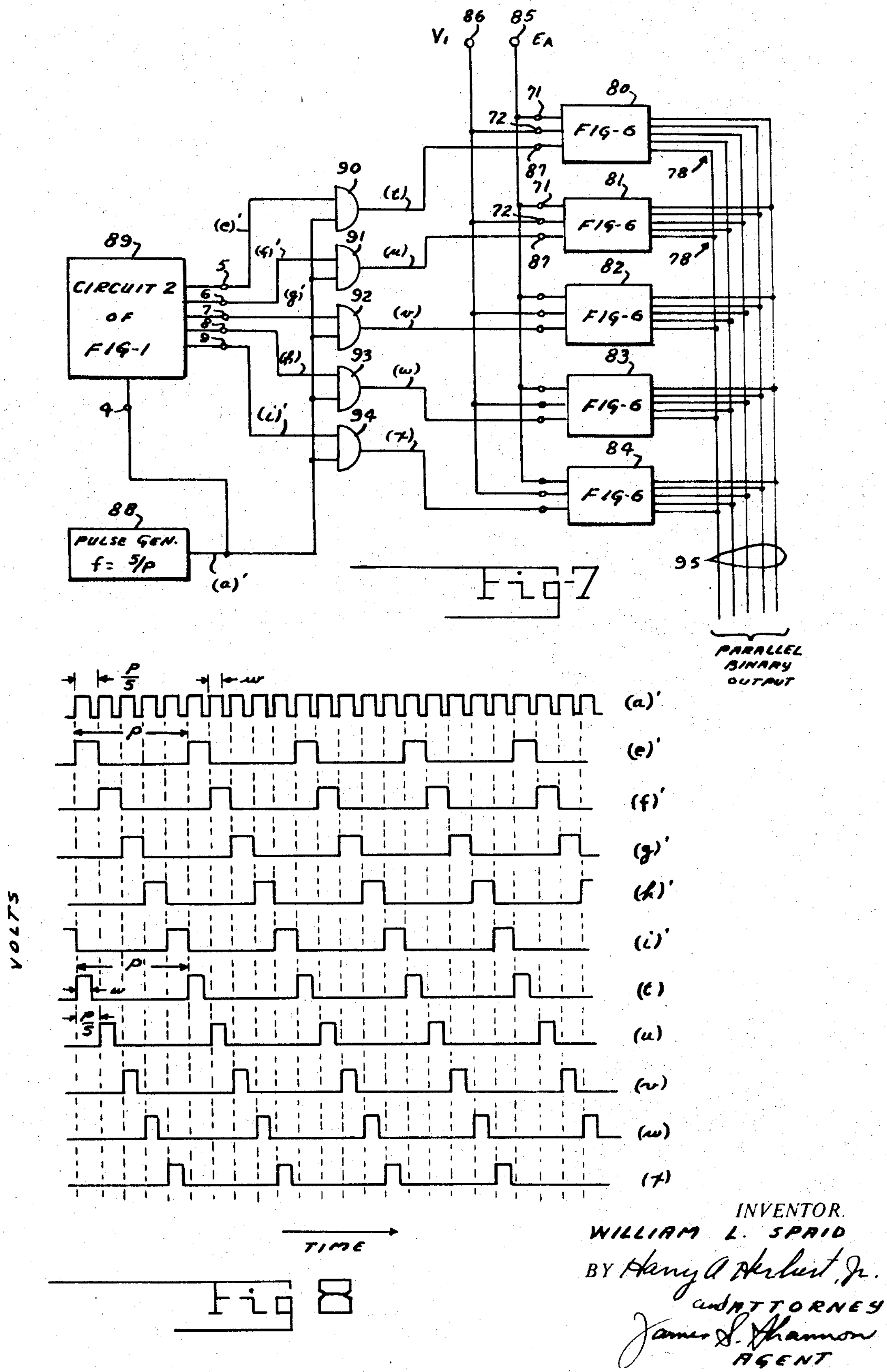

Briefly, this is accomplished by charging a first capacitor to the analog voltage and a second capacitor to a voltage equal on the analog scale to the value of the most significant bit of the binary number. Starting in synchronism with a particular clock pulse of a series of pulses equal to the number of bits of the binary number, the second capacitor is allowed to discharge continuously as an exponential function of time such that the capacitor voltage at the occurrence of each succeeding clock pulse in the series has one-half the value it had at the preceding pulse. At each pulse in the series the voltage of the first capacitor is compared with the voltage of the second capacitor. If greater, the first capacitor is permitted to discharge during the succeeding pulse interval sufficiently to reduce its voltage by the amount of the second capacitor voltage at the time of the comparison. If less, the first capacitor voltage is held constant during the ensuing pulse interval. At each comparison, a binary 1 is generated if the first capacitor voltage is greater than the second capacitor voltage and a binary 0 if less, thus generating a serial binary number with the bits occurring in synchronism with the clock pulses. By staggering by one clock pulse interval the conversion cycles of as many of the above-described converters as there are bits in the binary number and storing their serial outputs in parallel form in shift registers, a parallel binary readout can be obtained at an analog sampling rate equal to the clock pulse rate. For sampling rates at a multiple of the clock pulse rate, a plurality of the foregoing clock pulse rate parallel readout circuits, equal in number to the desired multiple, are employed under the control of clock pulse series of the same frequency as the primary clock rate but staggered by amounts equal to the clock pulse interval divided by the selected multiple. A more detailed description of the invention will be given with reference to the accompanying drawings in which:

FIG. 1 is a schematic showing of an analog to serial binary converter in accordance with the invention together with a programmer for controlling its operation, FIGS. 2 and 3 show waveforms occurring in the circuits of FIG. 1, FIG. 4 shows a suitable comparator for use in FIG. 1, FIG. 5 shows a suitable comparison decision circuit for use in FIG. 1, FIG. 6 shows an arrangement of serial converters of the type shown in FIG. 1 having a parallel binary output at an analog sampling rate equal to the clock pulse rate, FIG. 7 shows an arrangement of a plurality of circuits of the type shown in FIG. 6 for obtaining a parallel binary output at a sampling rate that is a multiple of the clock pulse rate, FIG. 8 gives waveforms occurring in FIG. 7, and FIG. 9 shows a modification of FIG. 6 as employed in the arrangement of FIG. 7. Referring to FIG. 1, the operation of the analog to serial binary converter represented by rectangle 1 is controlled by a programmer represented by rectangle 2. The operation of the programmer is illustrated by the waveforms of FIG. 2. The clock pulses (a), supplied by clock pulse generator 3, which may be the clock of a computer, have a duration $w$ and a repetition interval $p$. These pulses are applied through clock input terminal 4 to a cascade of three binary counters or flip-flops (FF) arranged in a counting circuit in which the count is arrested and restarted after each count of five pulses. This behavior is represented by the waveforms (b), (c), and (d), considering the first clock pulse in the diagram as starting a count. By a suitable arrangement of AND gates as shown, the waveforms (b), (c), and (d) may be employed to generate waveforms (e), (f), (g), (h), and (i) at the programmer output terminals 5–9, respectively. As may be seen in FIG. 2, these waveforms are identical except for their phases, being staggered in time by one clock pulse interval.

The manner in which these waveforms control the converter circuit 1, which they reach through terminals 10–14, is illustrated in FIG. 3 where they have been repeated on a larger scale, together with waveform (a), for convenience. The analog voltage to be converted into a binary number is represented by $E_A$ and is applied to terminals 15–16. A voltage $V_1$, having a value on the analog scale equal to the value of the most significant bit in the binary number, is supplied by source 17 and is applied to terminals 18–19. The sampling of the analog voltage occurs at the start of the conversion cycle during the positive-going portion of waveform (e) applied to terminal 10. For reasons which will be apparent later, the positive-going portion is shortened by delaying its leading edge by one clock pulse duration $w$, as shown by waveform (j). This is accomplished by AND-gate 20 and network 21 of delay $w$. The leading edge of the shortened positive-going portion marks the beginning of a conversion cycle and is designated $t_0$ in FIG. 3. Voltage source 22 normally biases transistors 23 and 24 to full conduction so that terminals 25 and 26 of capacitors $C_1$ and $C_2$ are at substantially ground potential. The positive-going portion of waveform (j), after inversion in network 27, is applied through resistor 28 to the bases of transistors 23 and 24, lowering their potentials below cutoff and in effect disconnecting terminals 25 and 26 of capacitors $C_1$ and $C_2$ from ground. Therefore, during the interval $t_0$–$t_1$, capacitor $C_1$ charges through transistors 29, small, limiting resistor 30, and diode 31 to the analog voltage $E_A$. Similarly, capacitor $C_2$ charges to the potential $V_1$ through transistor 32, resistor 33, and diode 34. The time constants of the two charging circuits are made such that the capacitor voltages can reach the values $E_A$ and $V_1$, during the interval $t_0$–$t_1$.

At the end of the positive-going waveform (j), which occurs at $t_1$, conduction is restored in transistors 23 and 24 and terminals 25 and 26 of $C_1$ and $C_2$ are again clamped to ground potential. This carries terminals 35 and 36 of $C_1$ and $C_2$ below ground by the amounts $E_A$ and $V_1$, as shown by waveforms (k) and l, respectively, of FIG. 3. Diodes 31 and 34 are nonconductive and in effect open circuits while terminals 35 and 36 are below ground potential.

At $t_1$ capacitor $C_2$ starts a continuous discharge through transistor 24 and resistor 37, causing the potential of terminal 36 to rise exponentially toward ground, as represented by waveform l of FIG. 3. The constants of the discharge circuit are so selected that the capacitor loses half its voltage in one clock interval $p$. Thus, the voltage across $C_2$ at $t_1$ is $V_1$, at $t_2$ is $V_1/2$, at $t_3$ is $V_1/4$, at $t_4$ is $V_1/8$, and at $t_5$ is $V_1/16$. The relationships in the discharge circuit required to give this result are given by $$C=(t/R \log_e 2)$$

where $C$ = capacitance of $C_2$ $t$ = clock pulse interval $p$ $R$ = resistance of resistor 37.

The discharge circuit for capacitor $C_1$ will now be described. Starting at terminal 25 this circuit extends through transistor 23, DC source 38, one of the transistor switches 39–42, the resistor 43–46 associated with the particular transistor switch, and transistor 47 to terminal 35. Transistor switches 39–42 are normally biased beyond cutoff, i.e., to an open circuit condition, by a positive voltage applied to their bases from DC source 48. A negative-going voltage pulse from any of inverters 49–52 opposes the bias on the associated transistor switch and renders the switch fully conductive, i.e. closed, for the duration of the pulse, permitting $C_1$ to discharge through that particular switch. Since the emitter resistance of transistor 47 is low relative to the resistance $R$ of resistor 43, the value of the emitter current is determined for practical purposes by the voltage $V_2$ of source 38 and the resistance of the particular resistor 43–46 that is in series with the closed switch. Thus, the emitter currents have values of $V_2/R$, $V_2/2R$, $V_2/4R$, and $V_2/8$ R depending upon the switch that is closed. Since the collector current of transistor 47 has a fixed relation to the emitter current, the discharging currents of $C_1$ have the same factor of 2 relationship as the emitter currents and, like the emitter currents, are constant. The values of $V_2$ and $R$ are so chosen that, when switch 39 is closed, the voltage on $C_1$ is reduced by the amount of $V_1$ during one clock pulse repetition period $p$. It follows that the $C_1$ voltage is reduced by the amounts $V_1/2$, $V_1/4$, and $V_1/8$ when switches 40, 41, and 42, respectively, are closed. The inputs to inverters 49–52 are derived from AND-gates 53–56 which are controlled by the Q output of decision FF 57, applied to all of the gates, and the waveforms (f)–(i) which are applied to gates 53–56, respectively, from programmer 2 through terminals 11–14.

The basic circuit used to charge and discharge $C_1$ and $C_2$ is described and claimed in my application Ser. No. 771,026 filed Oct. 28, 1968.

The comparator 58 continuously compares the voltage across $C_1$ with the voltage across $C_2$, or, in other words, the voltage at terminal 35 with the voltage at terminal 36, and produces an output voltage on line 59 that indicates which is the greater. In the specific embodiment shown, the voltage on line 59 has the higher of two values when the potential at terminal 35 is greater than the potential at terminal 36 ($C_1$ potential > $C_2$ potential) and the lower of the two values when the potential at terminal 35 is less than the potential at terminal 36 ($C_1$ potential < $C_2$ potential). Any comparator circuit capable of performing this function with high speed and high resolution may be employed. Suitable circuits for this purpose are available commercially, an example being one designated μA710C HIGH-SPEED DIFFERENTIAL COMPARATOR made by Fairchild Semiconductor Division of Fairchild Camera and Instrument Corporation . This circuit is in integrated circuit form and is illustrated schematically in FIG. 4.

The output of comparator 58 is applied to the D input of decision flip-flop (FF) 57 which also receives clock pulses at clock input C. The purpose of FF 57 is to determine the state of the output of comparator 58 at each clock pulse and, depending upon this state, to control both the generation of the bits of the binary number at binary output terminal 60 and the discharge of $C_1$. FF 57 has two stable states in one of which the Q output voltage has the higher of two values and in the other of which it has the lowered of the two values. At each clock pulse it either holds its state or switches to the other state depending upon its state and the comparator output voltage at D when the clock pulse occurs. In the embodiment described, if the comparator output voltage is high ($C_1$ potential > $C_2$ potential) when the clock pulse occurs, the Q output of FF 57 either remains high or changes to high; and, if the comparator output voltage is low ($C_1$ potential < $C_2$ potential) the Q output either remains low or changes to low.

FF 57 controls the generation of the binary bits at terminal 60 by means of AND-gate 61. If the Q output is high ($C_1$ potential > $C_2$ potential), gate 61 admits the clock pulse to terminal 60 thus generating a binary 1. If the output is low ($C_1$ potential < $C_2$ potential), gate 61 prevents the clock pulse from reaching terminal 60, representing a binary 0.

FF 57 controls the discharge of $C_1$ by means of AND-gates 53–56. When the Q output is high, that gate receiving the positive-going portion of waves (f)–(i) acts to close the corresponding transistor switch 39–42 and permit $C_1$ to discharge during the subsequent pulse interval $p$ in the manner already described. When the Q output is low, none of the gates 53–56 has an output and all of switches 39–42 are open so thactC$_1$ holds its charge during the ensuring pulse interval $p$.

Bistable circuits capable of performing the functions of FF 57 are available commercially and the design of this circuit is not a part of the invention. A suitable design, composed of NAND gates and adaptable to integrated circuit techniques, is shown in FIG. 5 together with its truth table. In the table, 1 represents the higher of the two possible voltage levels at the terminals and 0 the lower of the two voltages. The states shown after the clock exist immediately after the leading edge of the clock pulses. A slight delay 62 permits the comparator output at the first comparison in the conversion cycle ($t_1$ in FIG. 3) to reach a steady state before the clock pulse is applied to FF 57. Another slight delay 63 compensates for the switching delay of the bistable circuit.

One complete analog to binary conversion cycle may now be described. Referring to FIGS. 1 and 3, the cycle starts at $t_0$, the leading edge of the positive-going portion of waveform (j). During this portion, which lasts for the interval $t_0$–$t_1$, transistors 23 and 24 are nonconductive, and the voltages $E_A$ and $V_1$ are transferred to $C_1$ and $C_2$, respectively, in the manner already explained. Sampling of the analog voltage therefore occurs during this interval. At $t_1$, terminals 25 are brought to ground potential by the restored conduction in transistors 23 and 24, and terminals 35 and 36 are below ground by the voltages $E_A$ and $V_1$ as shown by waveforms (k) and 1. At the clock pulse occurring at $t_1$ the comparator 58 output is high, since the $C_1$ potential $E_A$ exceeds the $C_2$ potential $V_1$, and the Q output of FF 57 is therefore high, as seen in waveform (m). This permits the clock pulse at $t_1$ to pass gate 61 thus generating the most significant bit of the binary number as a binary 1, as shown in waveform (s). Also, with the Q output of FF 57 high for the interval $t_1$–$t_2$, gate 53, which has the positive-going portion of waveform (f) applied at this time, has an output during this interval that closes switch 39. This permits $C_1$ to discharge through this switch during the interval $t_1$–$t_2$ sufficiently to reduce its voltage by an amount equal to the voltage $V_1$ in the manner already explained. In this way the quantity represented by the binary 1 at the most significant position in the binary number is subtracted from the original value of the analog.

At $t_2$ the second comparison is made between the $C_1$ potential which is now $E_A$–$V_1$ and the $C_2$ potential which is now $V_1/2$, having fallen to half its original value in the interval $t_1$–$t_2$, as already explained. At this comparison, the $C_1$ potential is less than the $C_2$ potential, indicating that the quantity represented by the second most significant bit in the binary number is not present in what remains of the analog. Therefore, the output of comparator 58 is low and the Q output of FF 57 switches from high to low at $t_2$. With the Q output low, the clock pulse at $t_2$ does not pass gate 61, thus generating the second most significant bit of the binary number as a 0 as shown by waveform (s). Also, with the Q output low, the waveform (g) at gate 54 produces no output from this gate and transistor switch 40 remains open. Consequently, the voltage of $C_1$ is held constant during the interval $t_2$–$t_3$ preparatory to the comparison at $t_3$ with the voltage $V_1/4$ of $C_2$ to determine whether the remainder of the analog is greater than the quantity represented by the third most significant bit of the binary number.

Since at $t_3$ the $C_1$ potential is greater than the $C_2$ potential, the Q output of FF 57 is high and a binary 1 is generated at terminal 60. Also, transistor switch 41 is closed permitting $C_1$ to discharge by the amount $V_1/4$ during the ensuing pulse interval $t_3$–$t_4$. At $t_4$, the $C_1$ potential is still greater than the $C_2$ potential, resulting in the generation of a binary 1 and further reduction in the $C_1$ potential by the amount $V_1/8$ during the interval $t_4$–$t_5$. At $t_5$, in the example given, the last bit of the binary number is generated. As seen in FIG. 3, the $C_1$ potential at this time is less than the $C_2$ potential so that the comparator 58 output is at its lower value and, as a result, the Q output of FF 57 drops to its lower value, resulting in the generation of a binary 0 at terminal 60. The delay in the leading edge of the positive-going portion of waveform (j) by the amount of the clock pulse duration $w$, accomplished by elements 20–21 as explained earlier, insures that comparator 58 and FF 57 are not disturbed until the final bit has been generated.

The above described conversion cycle continues in a repeating sequence with a bit being generated at each clock pulse, the five bits constituting the binary number in the illustrative example given being generated by times $t_1$–$t_5$ of each cycle. By extending the apparatus of FIG. 3 as required, the same principles may be employed to generate a binary number of any number of bits.

In the arrangement of FIG. 1, the analog sampling rate depends upon the number of bits generated for the digital output, the interval between samplings being equal to the number of bits times the clock pulse repetition interval $p$. FIG. 6 shows an arrangement in which the sampling rate equals the clock pulse rate and in which readouts in parallel binary form are obtained at the clock pulse rate. This system comprises as many of the analog to serial binary converter circuits 1 of FIG. 1 as there are bits in the serial binary number. By proper connection of terminals 10–14 of the circuits 1 to the terminals 5–9 of the programmer 65, which is identical with the programmer 2, in FIG. 1, the circuits 1 may be caused to operate in repeating sequences staggered by one clock pulse interval $p$. The serial output of each of the circuits 1 during each of its conversion cycles is stored in a shift register which is read out to the parallel output circuit of the system at the beginning of the next conversion cycle during the sampling interval.

Describing FIG. 6 in more detail, elements 66–70 are all identical to the analog to serial binary converter circuit 1 of FIG. 1. The analog voltage $E_A$ is applied to terminal 71 and thence to terminals 15 of circuits 66–70 in parallel. Similarly, the voltage $V_1$ is applied to terminal 72 and thence to terminals 18 in parallel. For simplicity, only the ungrounded terminals are shown in FIG. 6. Clock pulse generator 3, which is the same as that of FIG. 1, applies clock pulses to the clock input terminals 64 of converters 66–70, to programmer 65, and to the shift registers.

The relationship between programmer 65 and circuit 66 is the same as the relationship between programmer 2 and circuit 1 of FIG. 1, circuit 66 operating cyclically to produce successive serial binary numbers at output terminal 60 in the manner already described for circuit 1 with reference to FIGS. 1 and 3. Circuits 67–70 similarly operate to produce successive serial binary numbers at their output terminals 60, the only difference being that each starts its conversion cycle one clock pulse interval later than the preceding circuit in the series, circuit 66 starting one clock pulse interval after the start of the conversion cycle in circuit 70 to form a closed sequence. This is accomplished by the manner of connecting the terminals 10–14 of circuits 66–70 to terminals 5–9 of programmer 65. As seen in FIG. 6, these connections are such that the conversion cycle in circuit 66, as in circuit 1 of FIG. 1, starts with waveform (e), in circuit 67 with waveform (f), and so on to circuit 70 which starts with waveform (i).

The serial binary bits generated at binary output terminal 60 of each of the circuits 66–70 during each conversion cycle are stored in the corresponding one of shift registers 73–77 from which the complete binary number in parallel form is read out into the parallel binary output circuit 78 during the sampling period of the next conversion cycle. Thus, for circuit 66, for which the waveforms in FIG. 3 apply, the five bits enter the shift register 73 at times $t_1$–$t_5$ and are read out of the register during the sampling interval $t_0$–$t_1$ of the next conversion cycle. The readout is accomplished by applying waveform (j) at terminal 79 as a readout pulse to shift register 73. The operation for remaining circuits 67–70 is the same so that a readout to the parallel output circuit 78 occurs from one of the shift registers at each clock pulse.

FIG. 8 illustrates an arrangement in which the sampling rate can be made any multiple of the clock pulse rate with parallel binary readout as in FIG. 6. This involves using a number of the circuits of FIG. 6 equal to the desired multiple. In the example shown the multiple is 5 and therefore there are five of the FIG. 6 circuits 80–84 employed. The analog voltage is applied through terminal 85 to the terminals 71 of these circuits in parallel; similarly, $V_1$ is applied through 86 to the terminals 72. Clock pulses, having the repetition interval $p$ as in FIG. 6, are applied to the clock input terminals 87 at the same pulse repetition interval $p$ as in FIG. 6; however, the clock pulse trains are staggered in time by an interval equal to $p$ divided by the desired multiple. In the illustrated case the multiple is 5, giving a stagger interval of $p/5$.

The clock pulse trains for circuits 80–84 are generated by a circuit comprising a pulse generator 88 producing pulses of the same duration $w$ as the clock pulses in FIG. 6 but at five times the rate, a programmer 89 which is identical to programmer 2 in FIG. 1, and five AND-gates 90–94. The waveform of the output of generator 88 is designated (a)′ in FIG. 8. The waveforms at terminals 5–9 of programmer 89 are identical to those at these terminals of programmer 2 (FIG. 1) designated (e)–(i) in FIGS. 2 and 3 except for frequency and duration, and therefore have been designated (e)′–(i)′ in FIG. 8. These waveforms together with waveform (a)′ at AND-gates 90–94 produce the staggered clock pulse (t)–(x) for circuits 80–84. With the parallel binary output circuits 78 of circuits 80–84 all connected in parallel to the final output circuit 95, readouts from circuits 80–84 occur at intervals of $p/5$. Since outputs occur at this rate, the duration of the shift register output must be limited to $p/5$. This may be accomplished in any suitable manner, an example being given in FIG. 9. In this modification of FIG. 6, which is shown applied to shift register 73 but is similarly applied to all registers, the positive-going edge of the wave at terminal 79, which occurs at $t_0$ in the conversion cycle, is used to trigger a monostable multivibrator 96 which generates a readout pulse of duration $p/5$.

I claim:

1. A voltage analog to serial binary number converter for operation in synchronism with the clock pulses of a computer, comprising: a programmer 2 having a clock pulse input and $n$ output terminals where $n$ is the number of bits in said serial binary number, said programmer operating to produce at each output terminal a series of rectangular pulses having durations equal to the clock pulse interval and a period equal to $n$ times the clock pulse repetition interval, said pulses being staggered in time by one clock pulse interval so that said output terminals form a closed loop starting at any terminal of which there occurs in said loop a repeating sequence of contiguous pulses; and a converter circuit 1 having: pulse shortening means connected to one of the programmer output terminals for delaying the leading edges of the pulses at that terminal by one clock pulse duration to produce a shortened pulse; a first capacitor and a second capacitor; a voltage comparator for comparing the voltages of said first and second capacitors and producing an electrical output indicative of which voltage is the greater; a bistable circuit receiving the output of said comparator and said clock pulses as inputs and producing an electrical output during each clock pulse interval indicative of the comparator output at the start of the interval; ($n$-1) two-input AND gates corresponding to the remaining ($n$-1) programmer output terminals and each having an input connected to its corresponding output terminal; means for applying the output of said bistable circuit to the remaining of said AND gates in parallel; a normally operative discharge circuit for said first capacitor containing a constant current device having selectable constant current values capable of reducing the voltage of said first capacitor during one clock pulse interval by amounts equal on the analog scale to the values of the individual bits of said binary number; means applying the outputs of said AND gates to said constant current device for selecting its current value; a normally operative discharge circuit for said second capacitor having such time constant that the capacitor voltage at the end of any clock pulse interval is one-half the voltage at the start of the interval; means receiving said shortened pulse as an input and operative during said pulse to disable the discharge circuits of said first and second capacitors, to charge said first capacitor to said analog voltage, and to charge said second capacitor to a voltage equal on the analog scale to the value of the most significant bit of said binary number; and a bit generating AND gate to which said clock pulses and the output of said bistable circuit are applied as inputs, the output of said gate constituting the output circuit of said converter.

2. Apparatus as claimed in claim 1 and in addition: ($n$−1) of said converter circuits 1; means connecting the said pulse shortening means of each of said ($n$−1) additional converter circuits to the ($n$−1) programmer output terminals other than the terminal to which the pulse shortening means of the first mentioned converter circuit is connected; means connecting one input of each of the ($n$—1) two-input AND gates of each of the ($n$—1) additional converter circuits to the ($n$—1) output terminals of said programmer other than the terminal to which the pulse shortening means of the particular converter circuit is connected; $n$ shift registers each having $n$ output circuits for $n$-digit parallel binary numbers; means connecting the serial binary output of each of the $n$ converter circuits to the input of one of the shift registers; means for applying the said shortened pulse of each converter circuit to the associated shift register as a readout pulse; and means connecting the $n$ outputs of said shift registers in parallel to an $n$-conductor output circuit, said $n$-conductor output circuit constituting the output of a voltage analog to $n$-bit parallel binary number converter for which the analog sampling rate equals the clock pulse rate.

3. Apparatus as claimed in claim 2 and in addition: N of said voltage analog to parallel binary converters, where N is an integer; a source of high-repetition frequency pulses of the same duration as said clock pulses and having a repetition interval equal to said clock pulse interval divided by (N+1); means deriving from said high-frequency pulses (N+1) series of pulses having durations equal to said clock pulses, a period equal to the repetition interval of said clock pulses, and staggered in time by the repetition interval of the high-frequency pulses; means applying each of said (N+1) series of pulses as clock pulses to a corresponding one of the (N+1) analog to parallel binary converters; and means connecting the parallel binary output circuits of the said (N+1) analog to parallel binary converters in parallel to an $n$-conductor output circuit constituting the output of a voltage analog to $n$-bit parallel binary number converter for which the analog sampling rate is (N+1) times the clock pulse rate.

* * * * *